R. KOENIG.
MACHINE FOR SHAPING THE ENDS OF GLASS TUBES.
APPLICATION FILED JAN. 28, 1910.
982,212.
Patented Jan. 17, 1911.
6 SHEETS—SHEET 5.
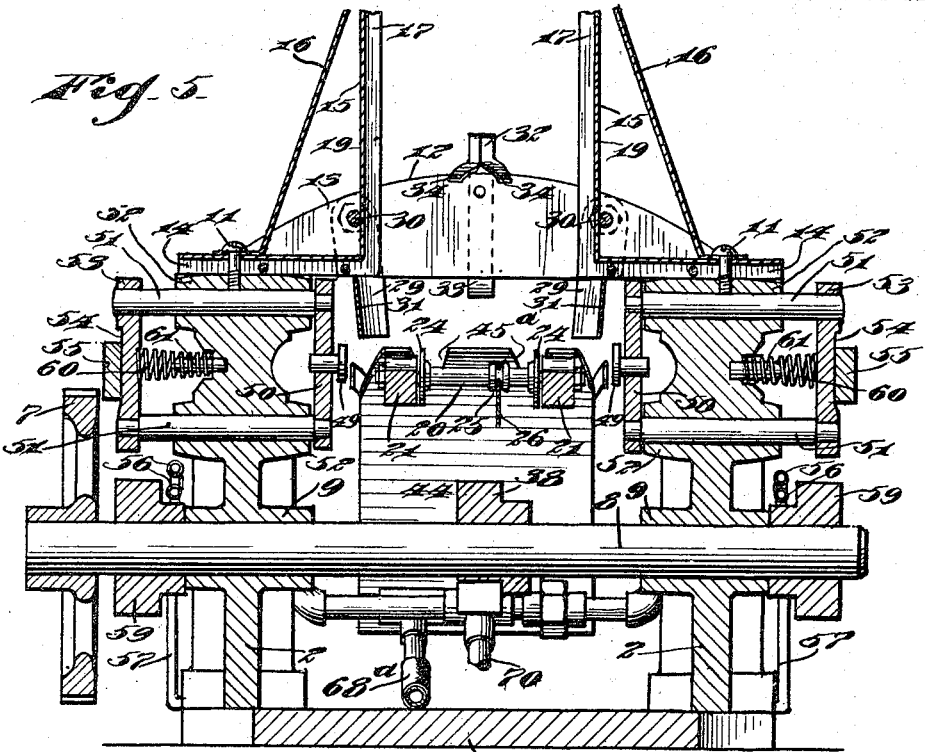

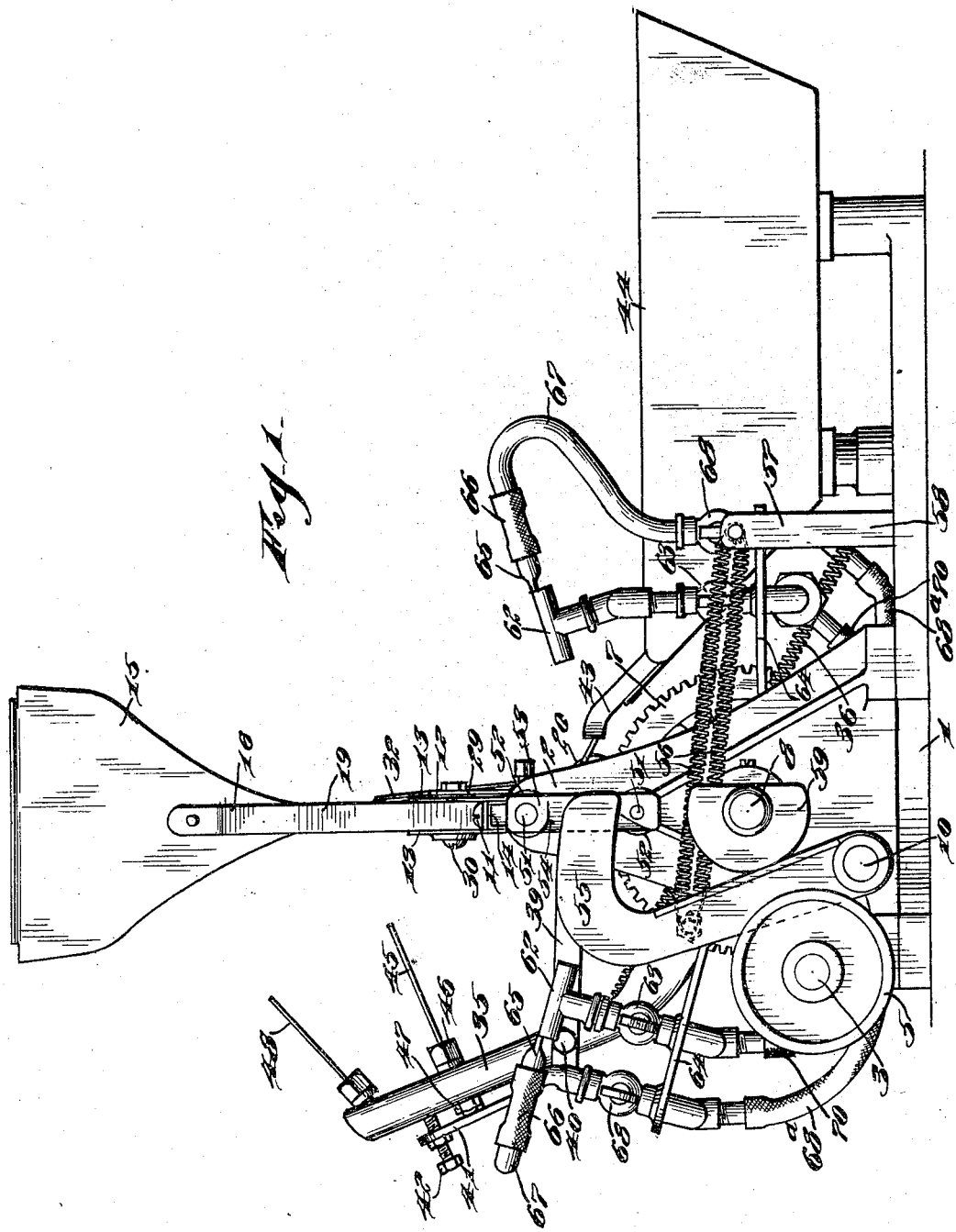

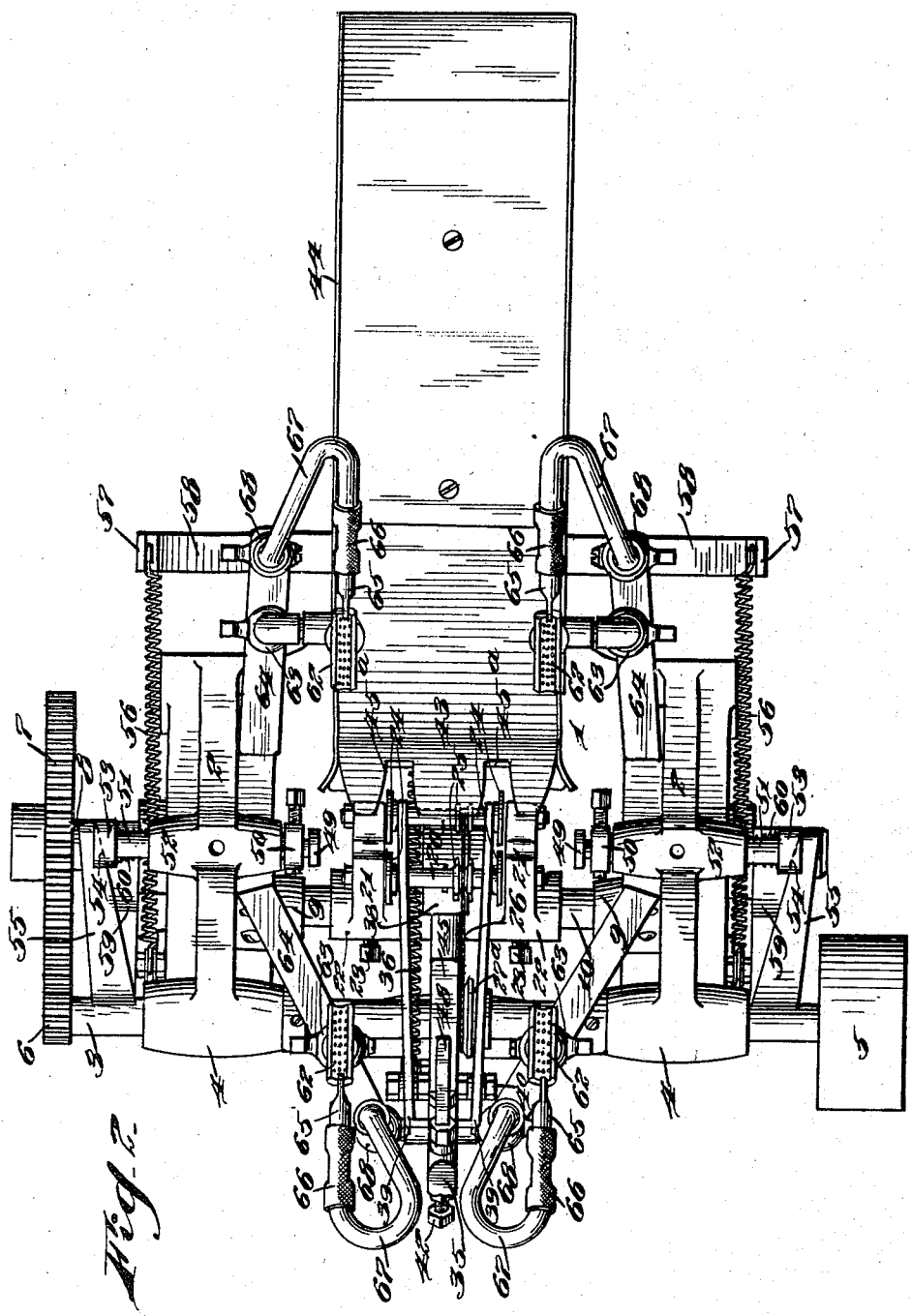

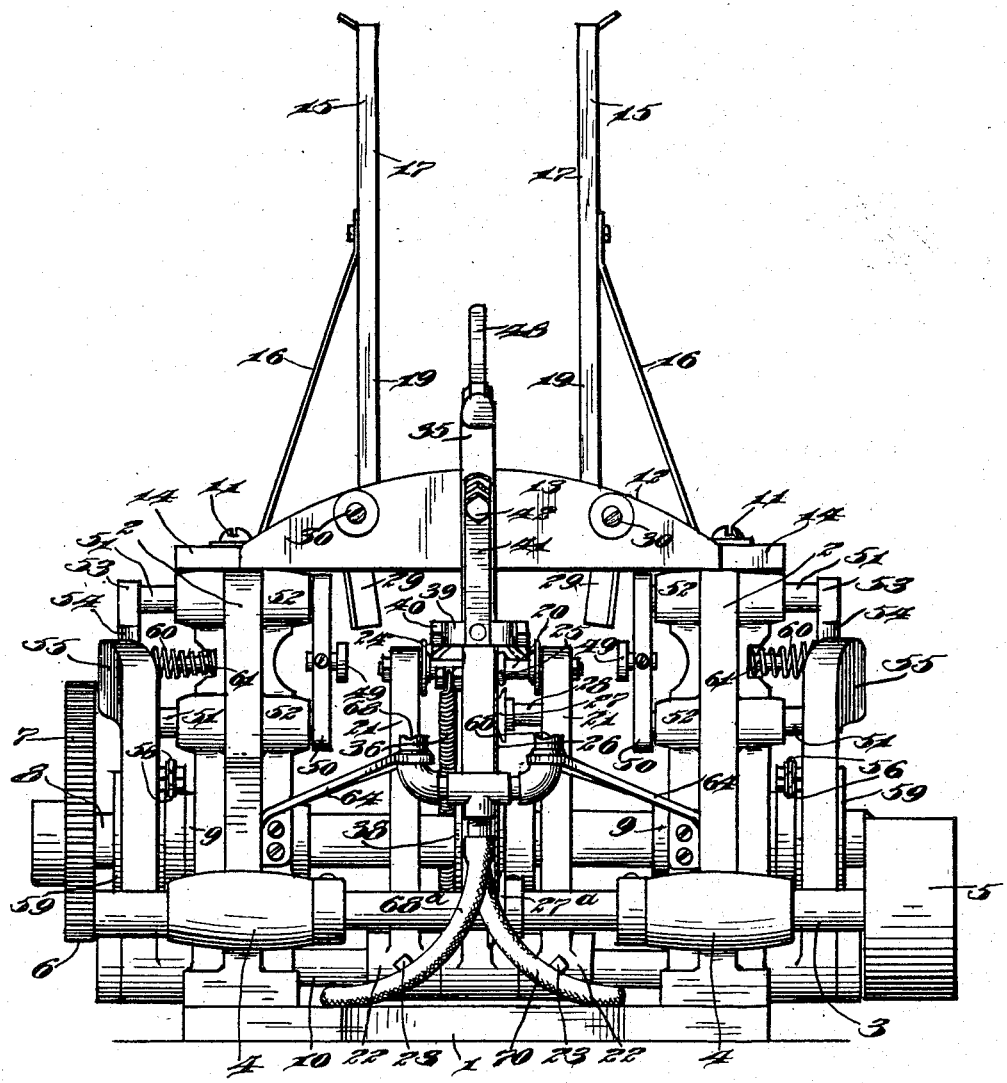

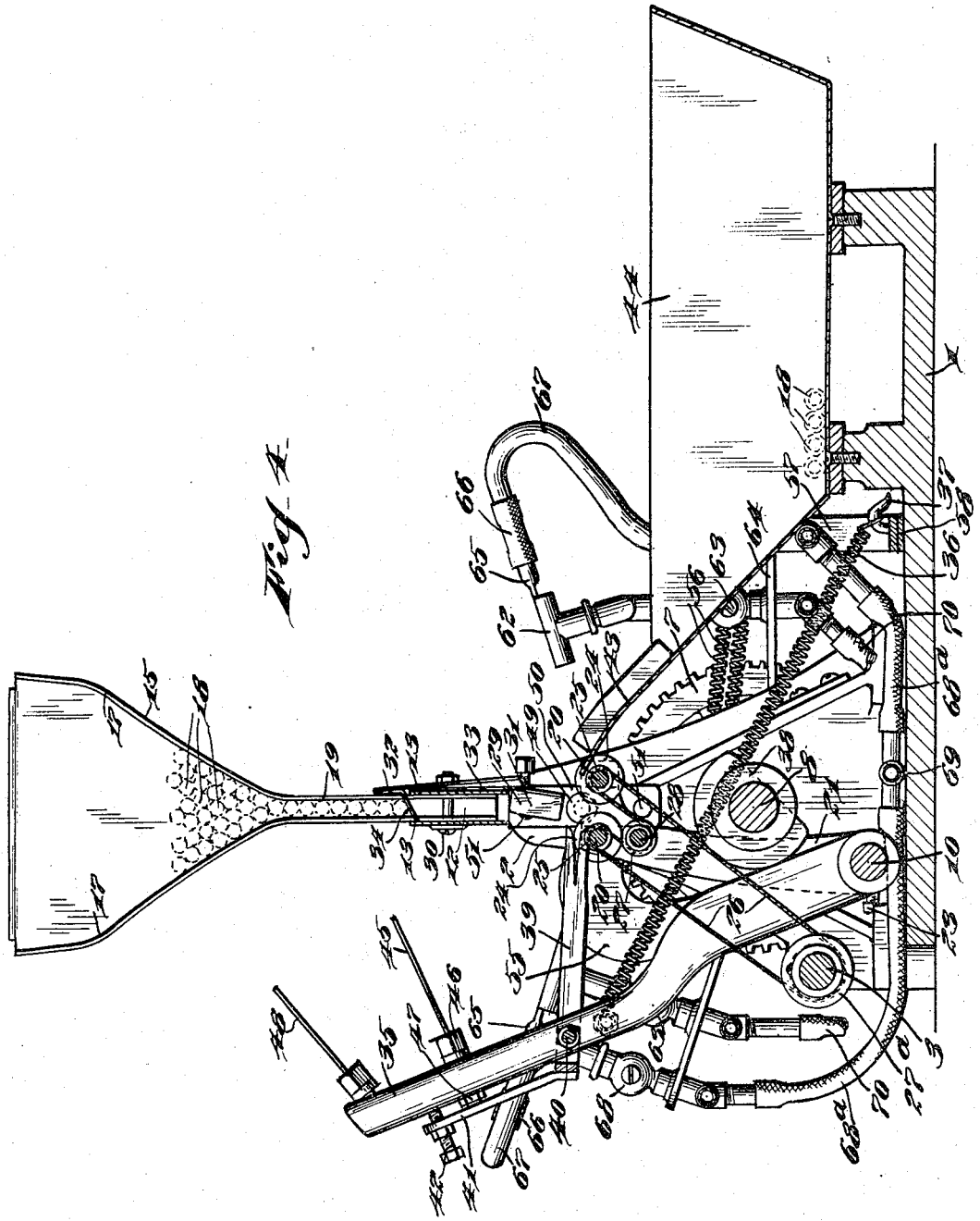

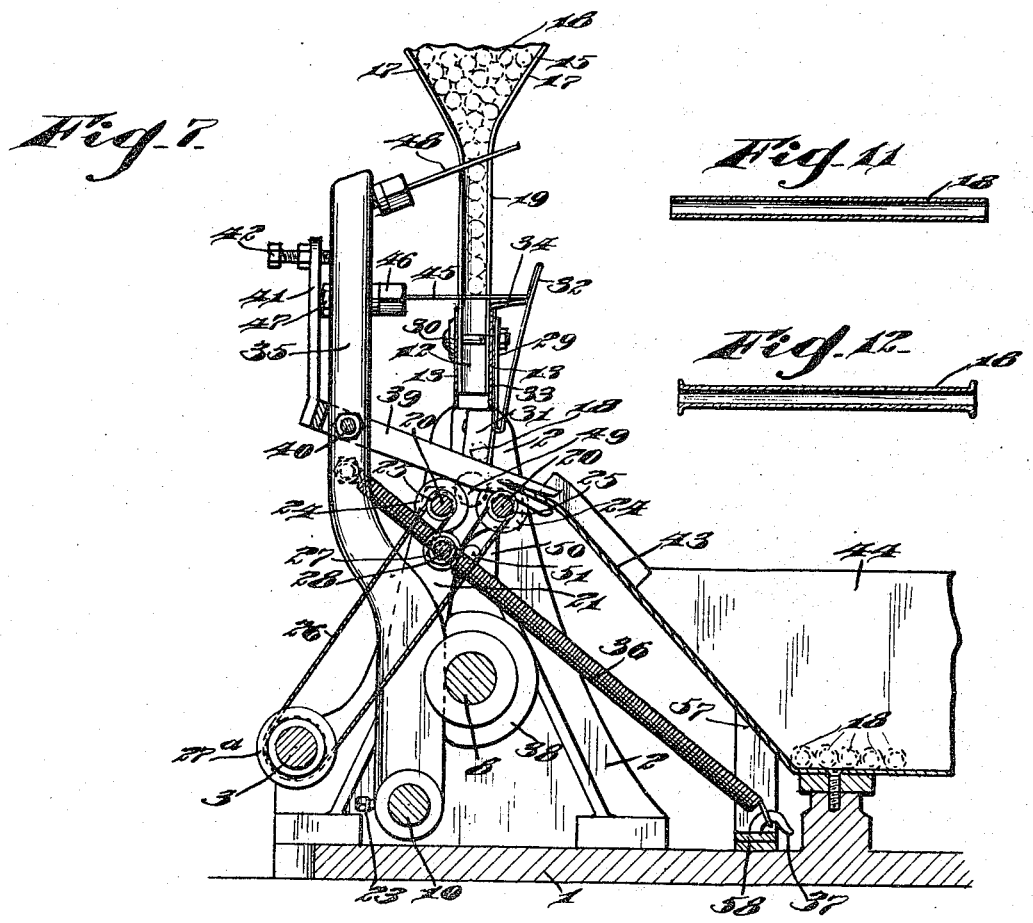
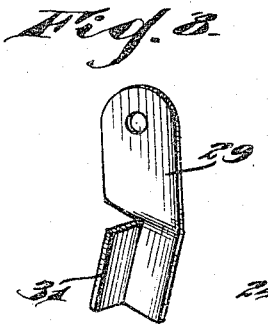
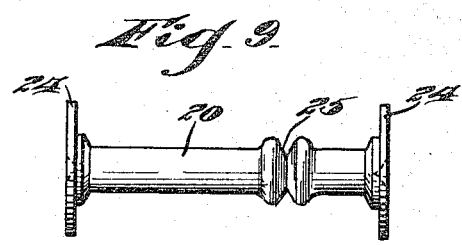
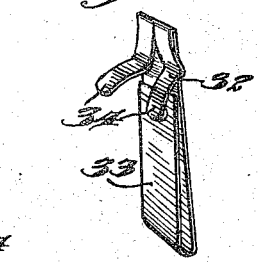

UNITED STATES PATENT OFFICE.

ROBERT KOENIG, OF CAMDEN, NEW JERSEY.

MACHINE FOR SHAPING THE ENDS OF GLASS TUBES.

982,212.     Specification of Letters Patent.     Patented Jan. 17, 1911.

Application filed January 28, 1910. Serial No. 540,531.

*To all whom it may concern:*

Be it known that I, ROBERT KOENIG, a citizen of the United States, residing at Camden, in the county of Camden and State of New Jersey, have invented certain new and useful Improvements in Machines for Shaping the Ends of Glass Tubes, of which the following is a specification.

My invention relates to improvements in machines for shaping the ends of glass tubes, the object of the invention being to provide improvements of this character which will automatically deposit a single glass tube upon rolls, which latter will keep the tube revolving while its ends are being heated, and provide improved means for shaping the ends of the tube while hot, and then ejecting the tube from the rolls into a suitable receptacle provided for the purpose.

A further object is to provide a machine of this character with an improved hopper for glass tubes, and improved means for ejecting a single tube at a time from said hopper, and for agitating the tubes in the hopper at the upper end of the chute to prevent bridging of the tubes and a stoppage of the feed.

A further object is to provide a machine of this character with improved means for heating the ends of the tubes while the latter are being continuously revolved.

A further object is to provide improved means for shaping the ends of the tubes while hot, improved means for operating said shaping means, and improved means for timing said operation.

A further object is to provide an improved machine of this character whose operations are entirely automatic and which may be run at a comparatively high speed, so that a large number of tubes may be shaped in a short space of time.

With these and other objects in view, the invention consists in certain novel features of construction and combinations and arrangements of parts, as will be more fully hereinafter described and pointed out in the claims:

In the accompanying drawings: Figure 1 is a view in side elevation illustrating my improvements. Fig. 2 is a top plan view with the hopper removed. Fig. 3 is a rear or end view. Fig. 4 is a view in vertical, longitudinal section through the center of the machine. Fig. 5 is a fragmentary view in cross section. Fig. 6 is a fragmentary rear view showing the inward position of the tube shaping plunger. Fig. 7 is a fragmentary view in longitudinal section taken on the same line as Fig. 4 but showing the parts in a different position. Figs. 8, 9, and 10, are views of details of construction. Fig. 11 is a view of the glass tube before being shaped, and Fig. 12 is a view of the finished tube.

1 represents the bed plate of the machine and 2, 2, are standards thereon, said standards being cast integral with the bed plate and of general triangular form so as to provide a number of bearings, as will more fully hereinafter appear. 3 represents the drive shaft, which is supported in suitable bearings 4 at the rear edge and near the lower ends of standards 2, and a drive pulley 5 is fixed to the shaft 3 at one end, while a pinion 6 is fixed on the shaft 3 at its opposite end and engages a large gear wheel 7 fixed to a counter shaft 8, the latter supported in suitable bearings 9 in standards 2, 2. A third rod 10 is supported in standards 2 and has no revolving movement.

On the upper ends of standards 2 and removably secured by screws 11 screwed into the standards, is a hopper frame 12, which latter is made up of a number of separate parts which comprise two parallel plates 13 secured to opposite sides of blocks 14, the latter secured by screws 11 to standards 2. Between these plates 13 are two parallel uprights 15, which latter are braced by strips 16, connecting uprights 15 with blocks 14. The uprights 15 constitute the hopper proper, as they are each provided with inwardly projecting flanges 17 at their side edges, and the upper ends of said uprights are enlarged in general hopper-form so as to accommodate a large number of glass tubes illustrated at 18, while the lower or chute portion 19 of said uprights 15 contain a column of single tubes and direct the tubes down between plates 13 on to rolls 20. These rolls 20 are supported in brackets 21 having bearing sleeves 22 at their lower ends to receive rod 10 and secured by set screws 23 to the rod. These rolls 20 are what are commonly termed in the trade "lamp workers' rolls". They are disposed parallel to each other in the same horizontal plane and slightly apart, and each have flanges or disks 24 at their ends upon which a tube 18 will rest and be revolved as the rolls 20 revolve. Each of these rolls 20 is provided with an annular grooved portion 25 constituting, in effect, a pulley, and an endless band 26 passes around a pulley 27ª on drive shaft 3, thence around the groove 25 on one roll 20, thence down around an idler 27 on a fixed shaft 28 on one of the brackets 21. Thence around the grooved portion 25 of the other roll 20 and back to the pulley 27ª. It will thus be noted that when the drive shaft 3 revolves, the rolls 20 will both be revolved in the same direction, and a glass tube 18 supported on these rolls will be given a continuous rotary motion as long as it remains upon the rolls 20.

Secured to one of the plates 13 are two sheet metal guides 29, which are secured by screws or bolts 30, and are preferably of sheet metal having their lower portions slit and bent at right angles as shown at 31 to form guides which may be properly placed in line with the uprights 15 to form, in effect, continuations of the uprights or side members of the hopper and guide the tubes into position upon rolls 20. The tubes are, however, normally held against downward movement by means of a spring gate 32, which comprises a single strip of sheet metal as shown most clearly in Fig. 10, bent upon itself as shown, and one member 33 secured to a plate 13. The other member of the gate extends upward above the plate and is provided with two bent tongues 34 which extend through the chute portion 19 of the hopper and across the path of the descending tubes 18, preventing them from moving downward until the gate is pushed out by my improved ejector arm 35.

The ejector arm 35 is pivotally mounted at its lower end upon rod 10, and is connected by a coiled spring 36 with a hook 37 fixed to bed plate 1 so as to draw the arm 35 forward when permitted by a cam 38 on counter shaft 8, but throughout the greater length of time this arm is held back in the position shown in Figs. 1 and 4 and is only permitted to come forward to the position shown in Fig. 7 when the flat portion of the cam 38 turns so as to register with the face of arm 35.

An ejector 39, which is in the form of a fork, is pivotally connected to arm 35 by means of a bolt 40, which passes through the forked ejector and through the arm, as clearly shown in Figs. 4 and 7, and is provided at its rear end with an upwardly projecting finger 41 having a set screw 42 therein, bearing against the rear face of arm 35 so as to properly position the ejector for the work it is to do. The forward ends of this ejector normally bear upon the rearmost roll 20, and the members of the ejector are split or slotted longitudinally at their ends, and their lower faces rounded or curved as shown. When the arm 35 moves forward, the ends of the ejector will engage the tube 18 on the rolls and force it off the rolls on to the inclined end 43 of a receptacle 44, and compel the tube to pass down into the receptacle. The end 43 is slotted as shown at 45ª to accommodate the ejector members 39, and as this end portion 43 is of sheet metal, the slots in the ends of the ejector 39 need be only wide enough to move on to the sheet metal so as to insure the tube being forced down the inclined end 43.

A flat steel tongue 45, having an enlargement 46 at its end, is secured by means of a nut 47 to the arm 35, which nut is screwed upon a threaded shank (not shown) extending through the arm. When the arm 35 moves forward, this tongue 45 moves between the lowest tube 18 in chute 19 and the tube 18 just above and engages the gate 32, forcing the tongues 34 out of the path of the lowermost tube and allowing the latter to fall down upon rolls 20, at the same time holding back all of the tubes above until the gate moves back into place, when the tubes will descend in the chute as will be readily understood. A second tongue 48 is secured to the arm 35 near its upper end and this tongue 48 moves through the arc of a circle, touching the juncture of the enlarged upper portion of the hopper with the chute 19, and the function of this tongue 48 is to move the tubes back from this point; or in other words, stir them up so as to prevent any two or more tubes from forming an arch at the point of juncture of the hopper proper with the chute 19, hence insuring a perfect downward feed of the glass tubes.

In line with the tubes 18, when in position on the rolls 20, I locate devices for shaping the ends of the tube. In the present instance, as shown most clearly in Figs. 5 and 6, disks or plungers 49 are shown, the function of which is to flange the ends of the glass tubes. These plungers 49 are fixed to bars 50, which latter are secured to rods 51, the latter mounted to slide in bearings 52 on standards 2. The outer ends of these rods 51 are connected by bars 53, having beveled intermediate portions 54 in engagement with cam arms 55, the latter mounted to swing on rods 10 and connected to coiled springs 56, the forward ends of said coiled springs being connected to the upright end portions 57 of a frame 58, the latter secured to the forward end portion of bed plate 1. These cam arms 55 are held normally in their rearward position by cams 59, secured upon shaft 8, so as to permit the plungers 49 to be held in their outward inoperative position by means of coiled springs 60, which are positioned on studs 61 projecting outward from standards 2 and bearing against bars 53, these springs 60 being preferably of the helical form shown.

In order to heat the ends of the glass tube 18 while it is being supported upon and turned by rolls 20, I provide four burners 62, preferably gas burners having suitable valves 63 and supported upon bars 64 extending front and rear from the standards 2, and locating the burners at opposite sides of the position occupied by tube 18 on the rolls 20. It will be noted that the burners proper 20 are T-shaped, have along their upper faces a series of perforations through which the gas burns, and in line with this perforated surface of the burners, blast nozzles 65 are located and are adapted to direct a blast of air across the burners, so as to blow the flame inward against the ends of the glass tube 18 and heat the latter to the desired temperature for shaping. These nozzles 65 are preferably connected by a flexible hose coupling 66 with pipes 67, the latter having valves 68 therein and said pipes supported also by the bars 64. The pipes 67 are all four connected by a hose 68ª with a supply pipe 69 connected with any suitable source of air supply, while all of the burners are connected by a hose 70 with any suitable source of gas supply.

The operation is as follows: With the parts as shown in Figs. 1 and 4, the glass tube 18 is being continuously revolved by means of the rolls 20 and the heat and flame from burners 62 is being blown against the ends of the tube 18 by means of the blast nozzles 65. As the shaft 3 is turned by means of pulley 5, connected with any suitable source of power, pinions 6 in mesh with gear 7 revolves shaft 8 and causes the cams 38 and 59 to turn. When the cams 59 turn so that their flat sides are engaged by the cam arms 55, springs 56 will draw the cam arms forward and the action of said cam arms against the bars 60 will force rods 51 and cross bar 50 inward, so as to press the plungers 49 against the hot ends of the glass tube 18 and flange the tube, when the cams 59 will again move the cam arms 55 rearward and permit springs 60 to return the plungers 49 to their former position. During this return movement of the plungers 49, cam 38 reaches a point in its revolution where its flat side is being presented to arm 35, coiled spring 36 then moves arm 35 forward, and as above explained, the ejector 39 engages the glass tube 18 which has been flanged as shown in Fig. 12, and forces this flanged tube from off the rolls 20 and down into receptacle 44. At the same time, tongue 45 moves between the lowest and the next lowest tubes 18 in chute 19 and forces back gate 32, permitting the lowermost tube to drop down upon ejector 39 and be held thereon against rolling down into receptacle 44, by means of the guides 29. At the same time, the tongue 48 pushes back the tubes in the upper portion of the hopper, preventing the formation of any arch or bridge in the chute of the hopper. The cam 38 then begins to move arm 35 rearward, which rearward movement of the arm causes the tongues 45 and 48 to pass out of the hopper, allowing gate 32 to return and close the end of the hopper and, at the same time, withdrawing the ejector 39 from below the tube thereon, and permitting this tube to drop down on to the rolls 20 when the operation above described is repeated. It will therefore be seen that the operation is a continuous one and entirely automatic, the speed of the machine only depending on the length of time necessary to properly heat the ends of the glass tubes.

While this particular machine discloses means for flanging the ends of the tubes, it is obvious that the tube ends may be given various shapes by the simple provision of other shaping means than the disks shown. I would therefore, have it understood that I do not limit my invention to any particular operation on the ends of the tubes, but consider myself at liberty to employ any means for shaping the ends of the tubes which can be utilized in connection with my improvements.

Various slight changes might be made in the general form and arrangement of parts described without departing from my invention, and hence I do not restrict myself to the precise details set forth, but consider myself at liberty to make such changes and alterations as fairly fall within the spirit and scope of the appended claims.

Having thus described my invention, what I claim as new and desire to secure by Letters Patent is:—

1. In a machine of the character described, the combination of tube supporting and turning rolls, each roll having disks adjacent its end adapted to support the glass tubes, means for shaping the ends of the tube while on the rolls, a hopper for glass tubes above said rolls, a pivoted arm, a tongue on said arm controlling the feed of tubes from said hopper to the rolls, an ejector on said arm ejecting the finished tubes from the rolls, said ejector movable below the hopper and adapted to catch tubes falling from the hopper and deposit them onto the rolls, substantially as described.

2. In a machine of the character described, the combination of glass tube supporting rolls, each roll having disks adjacent its ends adapted to support the glass tubes, means for turning the rolls to communicate a rotary motion to the tube, means for heating the ends of the tube, means for shaping the ends of the tube, a hopper for glass tubes above said rolls and a pivoted arm, a tongue on said arm controlling the feed of tubes from said hopper to the rolls, an ejector on said arm ejecting the finished tubes from the rolls, said ejector movable below the hopper adapted to catch tubes falling from the hopper and deposit them onto the rolls, substantially as described.

3. In a machine of the character described, the combination of glass tube supporting rolls, each roll having disks adjacent its ends adapted to support the glass tubes, means for turning the rolls to communicate a rotary motion to the tube, means for heating the ends of the tube, means for shaping the ends of the tube, a hopper for glass tubes above said rolls, a pivoted arm, a tongue on said arm controlling the feed of tubes from said hopper to the roll, an ejector on said arm ejecting the finished tubes from the rolls, said ejector movable below the hopper adapted to catch tubes falling from the hopper and deposit them onto the rolls, substantially as described.

4. In a machine of the character described, the combination of glass supporting and turning rolls, means for feeding by gravity tubes one at a time to said rolls, means for shaping the ends of the tubes while on the rolls, a pivoted arm, an ejector on said arm for ejecting the tubes from the rolls, said ejector movable below the hopper adapted to catch tubes falling from the hopper and deposit them onto the rolls, substantially as described.

5. In a machine of the character described, the combination of glass tube supporting rolls, means for turning the rolls to communicate a rotary motion to the tube, a pivoted arm, an ejector on said arm ejecting the tube from the rolls, a tongue on said arm compelling another tube to fall by gravity into place on the ejector, said ejector movable below the hopper adapted to catch tubes falling from the hopper and deposit them onto the rolls, and means for shaping the ends of the tubes while on the rolls, substantially as described.

6. In a machine of the character described, the combination of glass tube supporting rolls, each roll having disks adjacent its ends adapted to support the glass tubes, means for heating the ends of the tube while on the rolls, plungers in line with the ends of the tube on the rolls, means for forcing the plungers inward to shape the ends of the tube, a hopper for glass tubes above said rolls, a pivoted arm, a tongue on said arm controlling the feed of tubes from said hopper to the rolls, an ejector on said arm ejecting the finished tubes from the rolls, said ejector movable below the hopper adapted to catch tubes falling from the hopper and deposit them onto the rolls, substantially as described.

7. In a machine of the character described, the combination of glass tube supporting rolls, each roll having disks adjacent its ends adapted to support the glass tubes, means for heating the ends of the tube while on the rolls, plungers in line with the ends of the tube on the rolls, means for forcing the plungers inward to shape the ends of the tube, and a pivoted ejector for forcing the shaped tube from the rolls, said ejector movable below the hopper adapted to catch tubes falling from the hopper and deposit them onto the rolls, substantially as described.

8. In a machine of the character described, the combination of glass tube supporting rolls, each roll having disks adjacent its ends adapted to support the glass tubes, gas burners at opposite sides of the rolls adjacent both ends thereof, air blast nozzles positioned to blow across said burners and direct the flame and heat against a glass tube supported on said rolls, a hopper for glass tubes above said rolls, and a pivoted arm, a tongue on said arm controlling the feed of tubes from said hopper to the rolls, an ejector on said arm ejecting the finished tubes from the rolls, said ejector movable below the hopper adapted to catch tubes falling from the hopper and deposit them onto the rolls, substantially as described.

9. In a machine of the character described, the combination with a frame, of glass tube supporting and turning rolls in said frame, a hopper above said rolls adapted to contain glass tubes and direct them one at a time onto said rolls, and a pivoted arm, a tongue on said arm for controlling the feed of said tubes onto said rolls, an ejector on said arm movable below the hopper adapted to catch tubes falling from the hopper and deposit them onto the rolls, substantially as described.

10. In a machine of the character described, the combination with feeding rolls, of a hopper disposed above the feeding rolls and adapted to contain glass tubes and feed them downward one at a time, a gate normally closing the lower end of said hopper, means for moving said gate to release a single tube and permit it to fall on to the rolls, and a pivoted ejector for ejecting the tube from the rolls, said ejector movable below the hopper adapted to catch tubes falling from the hopper and deposit them onto the rolls, substantially as described.

11. In a machine of the character described, the combination with glass tube supporting and turning rolls, of a hopper supported above said rolls and adapted to feed glass tubes downward one at a time, guides at the lower end of said hopper adapted to guide the tubes onto the rolls, means for permitting a single tube to fall from the hopper onto the rolls, a pivoted arm, a tongue on said arm controlling the falling of tubes from the hopper, an ejector on said arm serving to eject the tubes from the rolls, said ejector movable below the hopper adapted to catch tubes falling from the hopper and deposit them onto the rolls, substantially as described.

12. In a machine of the character described, the combination with glass tube supporting and turning rolls, of a hopper above said rolls and adapted to feed the tubes downward one at a time, a gate at the lower end of said hopper holding the tubes against downward movement, a swinging arm, an ejector on said arm adapted to force the glass tubes from the rolls, and a tongue on said arm adapted to operate the gate and permit a single tube to fall from the hopper.

13. In a machine of the character described, the combination with glass tube supporting and turning rolls, of a hopper above said rolls and adapted to feed the tubes downward one at a time, a gate at the lower end of said hopper holding the tubes against downward movement, a swinging arm, an ejector on said arm adapted to force the glass tubes from the rolls, and a tongue on said arm adapted to operate the gate and permit a single tube to fall from the hopper, a spring tending to draw said arm in one direction and a rotary cam moving said arm in the opposite direction.

14. In a machine of the character described, the combination of glass tube supporting rolls, each roll having disks adjacent its ends adapted to support the glass tubes and having annular grooves between their ends forming pulleys, driving means in said grooves, and means for directing glass tubes on to said rolls.

15. In a machine of the character described, the combination with feeding rolls, of a hopper disposed above the feeding rolls and adapted to contain glass tubes and feed them downward one at a time, a gate normally closing the lower end of said hopper, means for moving said gate to release a single tube and permit it to fall on to the rolls, means for ejecting the tube from the rolls, and operating mechanism timing the operation of all of said means.

16. In a machine of the character described, the combination with glass tube supporting and turning rolls, of a hopper supported above said rolls and adapted to feed glass tubes downward one at a time, guides at the lower end of said hopper adapted to guide the tubes on to the rolls, means for permitting a single tube to fall from the hopper on to the rolls, means for ejecting the tube from the rolls, and operating mechanism timing the operation of all of said means.

17. In a machine of the character described, the combination with glass tube supporting and turning rolls, of a hopper above said rolls and adapted to feed the tubes downward one at a time, a gate at the lower end of said hopper holding the tubes against downward movement, a swinging arm, an ejector on said arm adapted to force the glass tubes from the rolls, and a tongue on said arm adapted to operate the gate and permit a single tube to fall from the hopper, and operating mechanism timing the operation of all of said means.

18. In a machine of the character described, the combination with glass tube supporting and turning rolls, of a hopper above said rolls and adapted to feed the tubes downward one at a time, a gate at the lower end of said hopper holding the tubes against downward movement, a swinging arm, an ejector on said arm adapted to force the glass tubes from the rolls, and a tongue on said arm adapted to operate the gate and permit a single tube to fall from the hopper, a spring tending to draw said arm in one direction and a rotary cam moving said arm in the opposite direction, and operating mechanism timing the operation of all of said means.

19. In a machine of the character described, the combination with glass tube supporting rolls, means for feeding glass tubes on to the rolls, means for shaping the ends of said tubes while on the rolls, an ejector adapted to deposit glass tubes onto the rolls and to move the glass tubes from the rolls, said ejector having rounded lower edges adapted to ride over the rolls, and operating mechanism timing the operation of all of said means.

20. In a machine of the character described, the combination with a bed plate and glass tube supporting rolls above the bed plate, each roll having disks adjacent its ends adapted to support the glass tubes, of standards on the bed plate at opposite ends of and spaced from the ends of the feed roll, plungers mounted to move laterally in said standards, means for moving said plungers to shape the ends of glass tubes on the rolls, and operating mechanism timing the operation of all of said means.

In testimony whereof I have signed my name to this specification in the presence of two subscribing witnesses.

ROBERT KOENIG.

Witnesses:
R. H. KRENKEL,
CHAS. E. POSY.